United States Patent
Soejima et al.

(10) Patent No.: US 8,326,517 B2
(45) Date of Patent: Dec. 4, 2012

(54) CONTROL DEVICE FOR INTERNAL COMBUSTION ENGINE

(75) Inventors: Shinichi Soejima, Gotenba (JP); Naoto Kato, Susono (JP); Kiyonori Takahashi, Susono (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 242 days.

(21) Appl. No.: 12/672,371

(22) PCT Filed: Jan. 20, 2009

(86) PCT No.: PCT/JP2009/050779
§ 371 (c)(1),
(2), (4) Date: Feb. 5, 2010

(87) PCT Pub. No.: WO2010/084578
PCT Pub. Date: Jul. 29, 2010

(65) Prior Publication Data
US 2011/0126803 A1     Jun. 2, 2011

(51) Int. Cl.
*B60T 7/12* (2006.01)
*G05D 1/00* (2006.01)
*G06F 7/00* (2006.01)
*G06F 17/00* (2006.01)

(52) U.S. Cl. .................. 701/105; 123/406.26

(58) Field of Classification Search .............. 123/406.22, 123/406.23, 406.26, 406.19, 406.41, 406.42, 123/435; 701/102, 111, 114, 115
See application file for complete search history.

(56) References Cited

U.S. PATENT DOCUMENTS

| | | | |
|---|---|---|---|
| 7,360,523 B2* | 4/2008 | Sloane et al. | 123/305 |
| 2006/0102147 A1* | 5/2006 | Norimoto et al. | 123/406.47 |
| 2007/0186902 A1 | 8/2007 | Zhu et al. | |

FOREIGN PATENT DOCUMENTS

DE    60 2005 000 053 T2    4/2007
(Continued)

OTHER PUBLICATIONS

International Preliminary Report on Patentability issued in International Patent Application No. PCT/JP2009/050779 dated Aug. 16, 2011.

(Continued)

*Primary Examiner* — Stephen K Cronin
*Assistant Examiner* — Sherman Manley
(74) *Attorney, Agent, or Firm* — Oliff & Berridge, PLC

(57) ABSTRACT

A control device for a spark-ignition internal combustion engine that sets ignition timing based on a target value of a predetermined combustion-related parameter correlated with a combustion state and operates an ignition device in accordance with the ignition timing thus set. The control device calculates an actual value of the combustion-related parameter from an output value of the cylinder pressure sensor and feeds back the calculated value of the combustion-related parameter to the setting of ignition timing. Further, in parallel with the above processing, the control device calculates a value of a predetermined combustion variation parameter correlated with the magnitude of combustion variation from the output value of the cylinder pressure sensor. If the calculated value of the combustion variation parameter deviates from an allowable range of the combustion variation, the control device stops the feedback of the calculated value of the combustion-related parameter.

6 Claims, 4 Drawing Sheets

FOREIGN PATENT DOCUMENTS

| | | |
|---|---|---|
| DE | 10 2008 000 52 A1 | 10/2008 |
| EP | 1 571 333 A1 | 7/2006 |
| JP | U-63-75567 | 5/1988 |
| JP | A-64-83860 | 3/1989 |
| JP | 2006170183 A * | 6/2006 |
| JP | A-2006-144672 | 6/2006 |
| JP | A-2006-170183 | 6/2006 |

OTHER PUBLICATIONS

International Search Report mailed on Feb. 17, 2009 in corresponding International Application No. PCT/JP2009/050779 (with translation).

* cited by examiner

CONTROL DEVICE FOR INTERNAL COMBUSTION ENGINE

TECHNICAL FIELD

The present invention relates to control devices for an internal combustion engine and more particularly to a control device for a spark-ignition internal combustion engine equipped with a cylinder pressure sensor.

BACKGROUND ART

There is known a method disclosed in JP-A-2006-170183 as a method of adjusting ignition timing by use of a cylinder pressure sensor. According to the method disclosed in this patent document, a combustion ratio at given timing is calculated based on an output value of the cylinder pressure sensor. In addition, combustion start timing, i.e., ignition timing in a combustion chamber is adjusted so that the calculated value may coincide with a target value. Specifically, the ignition timing is adjusted so that the combustion ratio may be 50% at eight crank angle degrees after top dead center. It is known that when the ignition timing corresponds to MET, the combustion ratio is 50% in the vicinity of 10° after top dead center. The method disclosed in the above-mentioned patent document is a method for achieving ignition at MBT by feeding back the output value of the cylinder pressure sensor. As a specific feedback, an ignition-timing calculation method is disclosed of calculating a deviation between a combustion ratio calculated from the output value of the cylinder pressure sensor and its target value and inputting the calculated deviation into a proportional-integral circuit.

A combustion state in a cylinder is directly reflected in the cylinder pressure measured by a cylinder pressure sensor. Therefore, it is possible to accurately control the combustion state in the cylinder by feeding back the combustion ratio to the setting of ignition timing as the method disclosed in the above-mentioned patent document.

However, although the advantage as described above is present, when combustion is unstable as during cold start or when a combustion state is drastically changing as during acceleration/deceleration, a combustion variation resulting from such things is also reflected in the cylinder pressure. Consequently, a value of a combustion ratio calculated from the cylinder pressure becomes variable, which is fed back to the setting of ignition timing. It is probable that this may adversely promote the combustion variation. That is to say, the method disclosed in the above-mentioned patent document has room for improvement in view of robustness, i.e., the stable control of a combustion state.

DISCLOSURE OF THE INVENTION

The present invention has been made to solve the above-described problem and aims to provide a control device for an internal combustion engine that can stably control a combustion state through ignition timing.

A control device of the present invention is a control device for a spark-ignition internal combustion engine equipped with a cylinder pressure sensor. The control device of the present invention includes means for setting a target value of a predetermined combustion-related parameter correlated with a combustion state. A value (actual value) of the combustion-related parameter can be calculated from an output value of the cylinder pressure sensor. The control device includes means for calculating the value of the combustion-related parameter. It is preferred that the combustion-related parameter be a parameter with respect to a combustion ratio or an amount of physics equivalent thereto. In particular, a 50%-combustion point retard amount relative to a predetermined crank angle (e.g. 10° after top dead center) is one of the most preferable parameters in view of having a deep relationship with MBT.

The control device of the present invention includes means for setting ignition timing based on the target value of the combustion-related parameter as well as means for feeding back the calculated value of the combustion-related parameter to the setting of ignition timing. In addition, the control device operates an ignition device of the internal combustion engine in accordance with the finally set ignition timing. However, the control device includes means for stopping the feedback of the calculated value of the combustion-related parameter under a certain condition. This condition is a case where the value (actual value) of the predetermined combustion variation parameter correlated with the magnitude of combustion variation deviates from an allowable range of combustion variation. In such a case, the stoppage of the feedback can prevent the combustion variation from being reflected in the setting of ignition timing. The value of the combustion variation parameter can be calculated from the output value of the cylinder pressure sensor. The control device includes means for calculating the value of the combustion variation parameter. An amount of statistics of the combustion-related parameter is preferable as the combustion variation parameter. For example, a value obtained by diving a difference between a maximum value and a minimum value of the combustion-related parameter in the past several cycles by an average value can be used as the combustion variation parameter.

In a more preferable aspect of the present invention, the control device includes means for feeding back torque generated by the internal combustion engine to the setting of ignition timing if the calculated value of the combustion variation parameter deviates from an allowable range of combustion variation. The generated torque of the internal combustion engine can be calculated from the output value of the cylinder pressure sensor. In a more preferable aspect, the control device includes means for calculating the generated torque of the internal combustion engine. The combustion-related parameter such as a 50%-combustion point retard amount is a value determined from the waveform of cylinder pressure relative to a crank angle. On the other hand, torque is a value obtained by integrating the cylinder pressure by the crank angle, i.e., a value corresponding to area. Therefore, although torque does not have high sensitivity relative to a variation in combustion state unlike the combustion-related parameter, it is not largely varied by the influence of the combustion variation. In a more preferable aspect, by feeding back torque in place of the combustion-related parameter, it is possible to exercise accurate control of the combustion state by continuous feedback control even in a large combustion variation state.

In a more preferable aspect of the present invention, the control device includes means for stopping the feedback of the calculated value of generated torque in a certain condition. This condition is a case where the calculated value of the combustion variation parameter deviates also from a second allowable range more moderate than the allowable range mentioned above. In such a case, by stopping all the feedback, it is possible to prevent the combustion variation from being reflected in the setting of ignition timing.

Incidentally, in the present invention, the means for setting ignition timing may include means for calculating the ignition timing based on a control value in accordance with a calculation rule determined according to a current or target operating condition of the internal combustion engine, the target value of the combustion-related parameter being used as the control value. If the ignition timing setting means is configured as described above, the means for feeding back the combustion-related parameter or torque can correct the control value so as to allow the calculated value of the combustion-related parameter to become equal to the target value. In this case, the influence of the operating condition on ignition timing is considered in the calculation process in obtaining ignition timing from the control value. Therefore, it is not necessary to consider the operating condition in calculating the feedback correction amount used to correct the control value. Thus, it is easy to optimally control the combustion state even in a situation where the operating condition is variable.

DESCRIPTION OF REFERENCE NUMERALS

Figure 1:
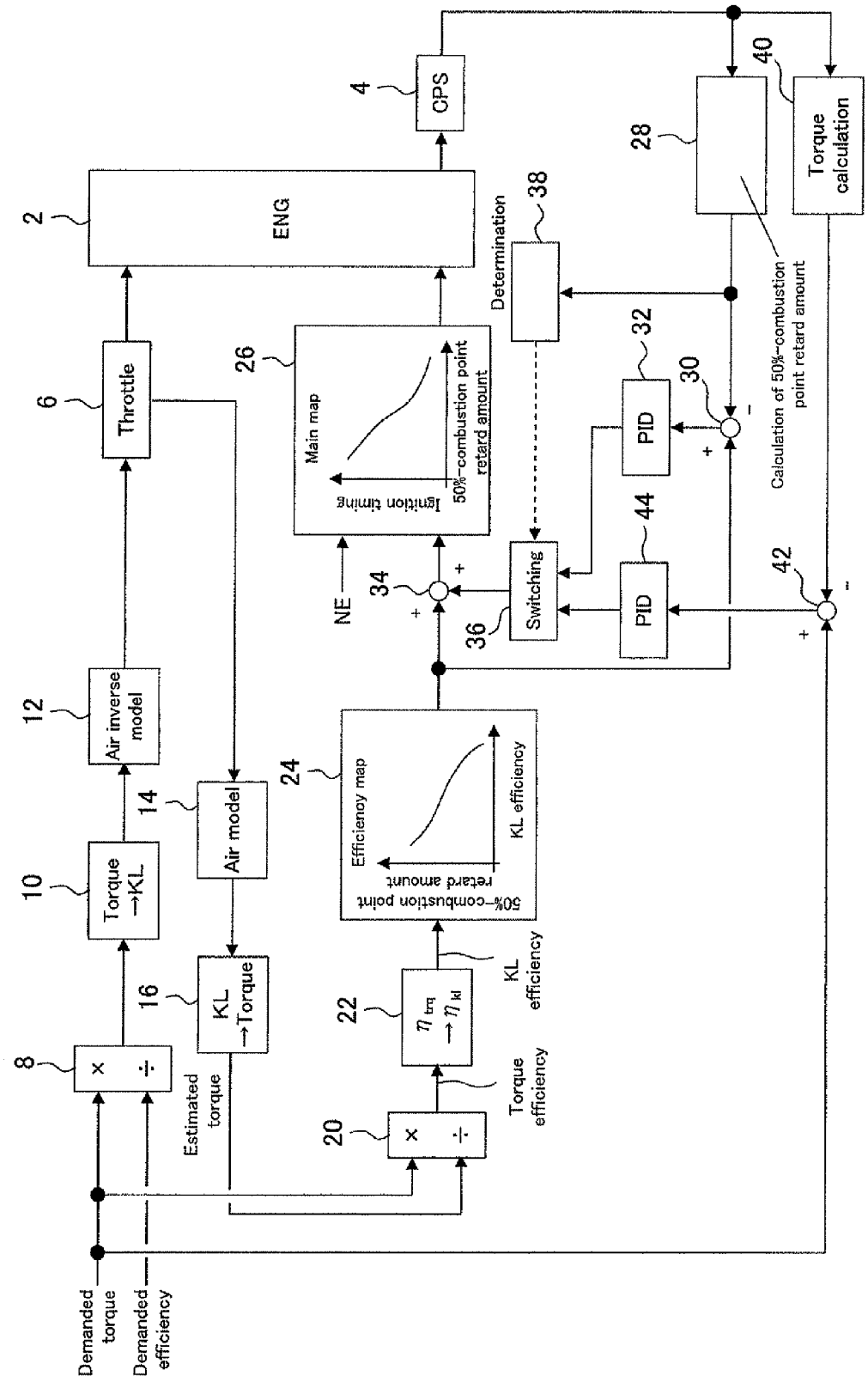
FIG. 1 is a block diagram illustrating a configuration of a control device for an internal combustion engine according to a first embodiment of the present invention.

2 Internal combustion engine
4 Cylinder pressure sensor
24 Calculation section of target value of 50%-combustion point retard amount
26 Calculation section of ignition timing
28 Calculation section of actual value of 50%-combustion point retard amount
32, 50 FB controller (50%-combustion point retard amount)
40 Calculation section of actual value of torque
44, 52 FB controller (torque)
36 Switch
38 Determination section

BEST MODE FOR CARRYING OUT THE INVENTION

First Embodiment

A first embodiment of the present invention will be described with reference to FIGS. 1 to 3.

Figure 2:
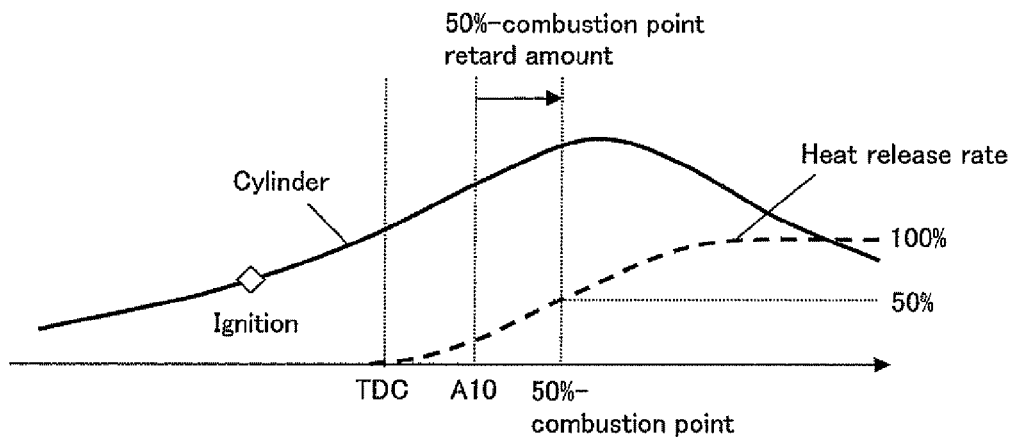
FIG. 2 is a diagram illustrating both a variation in cylinder pressure relative to a crank angle and a variation in heat release rate corresponding thereto.

FIG. 1 is a block diagram illustrating a configuration of a control device for an internal combustion engine according to the first embodiment of the present invention. The control device of the present embodiment is applied to a spark-ignition internal combustion engine and configured as a control device for controlling the operation of a throttle as an actuator and of an ignition device of the spark-ignition internal combustion engine.

The control device of the present embodiment obtains demanded torque and demanded efficiency from a power train manager (not shown) provided at the top of a control system. In addition, the control device controls the internal combustion engine, specifically, intake air amount and ignition timing to achieve these demands. The efficiency here means a rate of whole work to work that can be taken out from the internal combustion engine. The demanded efficiency means a ratio of work intended to be taken out, to work that can be taken out. Hence, the maximum value of the demanded efficiency is equal to 1.

A description is first given of control of an intake air amount exercised in the present embodiment. The control device sends obtained demanded torque and demanded efficiency to a divider 8, which calculates a value by dividing the demanded torque by the demanded efficiency. Since the demanded efficiency is a value equal to or smaller than 1, the value of torque calculated by the divider 8 is a value raised compared with the demanded torque.

Next, the control device allows an air amount conversion section 10 to convert the raised torque calculated by the divider 8 into an air amount (KL). The air amount obtained by the conversion process is a target air amount of the internal combustion engine. Incidentally, the term "the air amount" here means a cylinder intake air amount per one cycle. The cylinder intake air amount may be replaced with filling efficiency (a loading rate) obtained by making the air amount dimensionless. The conversion process uses a map making the connection between torque and an air amount. In the map, various operating conditions having an influence on the relationship between torque and an air amount, such as engine speed, an air-fuel ratio, etc., are taken as keys. However, it is assumed that ignition timing corresponds to MST.

Next, the control device allows a throttle opening degree setting section 12 to calculate a throttle opening degree from the target air amount. An inverse model of an air model is used to calculate the throttle opening degree. The air model is a physical model of an intake system and results from modeling the response of an air amount with respect to the throttle operation on the basis of fluid dynamics or the like. The control device sets the throttle opening degree converted from the target air amount as an amount of operating the throttle 6 and operates the throttle 6 in accordance with the throttle opening degree thus set.

A description is next given of control of ignition timing. In the present embodiment, a target value used to control ignition timing is torque efficiency. The torque efficiency is defined as a ratio of demanded torque to estimated torque of the internal combustion engine. The estimated torque used to calculate the torque efficiency is calculated based on the throttle opening degree.

To calculate the estimated torque, the control device first obtains an actual opening degree of the throttle 6 from the output value of the throttle opening degree sensor, the rotational amount of a throttle motor or the like. An estimated air amount calculation section 14 calculates an air amount estimated to be achieved at the throttle opening degree thus obtained. A forward model of the air model mentioned above is used to calculate the estimated air amount.

Next, the control device allows a torque conversion section 16 to convert to torque the air amount estimated from the throttle opening degree. The torque obtained in this conversion process is the estimated torque mentioned above. The conversion process uses a map making the connection between an air amount and torque. In the map, various operating conditions having an influence on the relationship between torque and an air amount, such as engine speed, an air-fuel ratio, etc., are taken as keys. However, it is assumed that ignition timing corresponds to MBT. Thus, the estimated torque means torque that can be achieved if the ignition timing corresponds to MBT, i.e., the maximum torque that can be achieved at a current amount of intake air.

The control device sends the obtained demanded torque and estimated torque to a divider 20, which calculates a value by dividing the demanded torque by the estimated torque. The value thus calculated is torque efficiency. The control device allows an efficiency conversion section 22 to convert the torque efficiency to KL efficiency. This conversion process uses a conversion equation or a map. The KL efficiency is a ratio of an air amount demanded to achieve the demanded torque, to the estimated air amount achieved at the current throttle opening degree. In the present embodiment, the KL efficiency is used to control ignition timing.

The control device controls the ignition timing to achieve the KL efficiency mentioned above. The ignition timing control method exercised in the present embodiment can be explained as a combination of feedforward control with feedback control.

The feedforward control determines a predetermined combustion-related parameter value on the basis of the target value of the KL efficiency and sets ignition timing by use of the combustion-related parameter value as a control value. The combustion-related parameter used in the present embodiment is a retard amount of a combustion point relative to a 10 crank angle degrees after top dead center (hereinafter, ATDC 10°). The 50%-combustion point is a crank angle in which a heat release rate (combustion rate) is 50%. FIG. 2 illustrates both a variation in cylinder pressure relative to a crank angle at the time of ignition at certain timing and a variation in heat release rate corresponding thereto. A heat release rate and a waveform of cylinder pressure have a correlation therebetween at any crank angle. Therefore, the heat release rate at any crank angle can be calculated from the corresponding waveform of cylinder pressure. The torque of the internal combustion engine is maximized when the 50%-combustion point exists close to ATDC 10° and the ignition timing at that time is the so-called MBT. When the 50%-combustion point exists at ATDC 10°, the efficiency of the internal combustion engine has a maximum value of 1. As the retard amount of the 50%-combustion point relative to ATDC 10° (hereinafter, simply also called the 50%-combustion point retard amount) increases, the efficiency of the internal combustion engine drops. The 50%-combustion point retard amount and the efficiency of the internal combustion engine have one-to-one relationship, which is not influenced by the operating conditions such as engine speed, etc. Thus, if ignition timing is controlled by use of the 50%-combustion point retard amount as a control value, the combustion state of the internal combustion engine can be controlled into a desired state.

The control device allows a calculation section 24 to calculate the 50%-combustion point retard amount corresponding to the target value of the KL efficiency. The calculation section 24 has a map making the connection between the KL efficiency and the 50%-combustion point retard amount. This map is created based on statistical data obtained from an experiment. The map is hereinafter called the efficiency map. The calculation section 24 uses this efficiency map to convert the target value of the KL efficiency to a 50%-combustion point retard amount. The value of the 50%-combustion point retard amount obtained by this conversion process is a target value of the 50%-combustion point retard amount and also is a base value of a control value used to determine ignition timing.

The control device further allows a calculation section 26 to determine ignition timing from the 50%-combustion point retard amount as a control value. The calculation section 26 has a map making the connection between the 50%-combustion point retard amount and the ignition timing. This map is hereinafter called a main map. The feature of the main map is that the 50%-combustion point retard amount and the ignition timing are correlated with each other while taking the operating conditions of the internal combustion engine as a key. The operating conditions taken as the key include at least engine speed (NE). If a target air-fuel ratio is variable, it is also included in the operating conditions. If valve timing is variable, it is also included in the operating conditions. If these operating conditions are varied, the waveform of cylinder pressure relative to a crank angle is varied even at the same ignition timing, with the result that the 50%-combustion point retard amount is varied. The main map is created based on statistic data obtained from experiments conducted by changing the various operating conditions taken as the key. To make the description simple herein, the operating condition considered in the main map is only engine speed. The calculation section 26 uses the main map to determine the ignition timing from current engine speed and the control value. The control device operates an ignition device of the internal combustion engine 2 at the ignition timing calculated by the calculation section 26.

The above is the ignition timing control through the feedforward control. Due to the influence of an individual difference of the internal combustion engine 2 and of adaptive accuracy of the main map, it is not always possible for only the feedforward control to control the combustion state of the internal combustion engine into a desired state. Therefore, what is combined with the feedforward control is feedback control described below.

To exercise the feedback control, the control device includes two feedback systems (a first feedback system and a second feedback system). Any of the feedback systems uses an output value of a cylinder pressure sensor (CPS) 4. The cylinder pressure sensor 4 is attached to part of or all of cylinders of the internal combustion engine.

In the first feedback system, the control device allows a calculation section 28 to calculate an actual value of a 50%-combustion point retard amount from the output value of the cylinder pressure sensor 4. The 50%-combustion point retard amount is a combustion-related parameter uniquely determined by the waveform of cylinder pressure relative to a crank angle. Therefore, a value of the 50%-combustion point retard amount is uniquely calculated by processing the output value of the cylinder pressure sensor 4 in accordance with a predetermined calculation rule. Incidentally, if the cylinder pressure sensor 4 is attached to each of the cylinders, the 50%-combustion point retard amount is calculated for each cylinder. If the cylinder pressure sensor 4 is attached to only one cylinder, the 50%-combustion point retard amount calculated for the cylinder represents those of the other cylinders.

In the first feedback system, the control device sends the 50%-combustion point retard amount (target value) calculated by the calculation section 24 and the 50%-combustion point retard amount (actual value) calculated by the calculation section 28 to a subtracter 30, which calculates a deviation between both. The control device sends the deviation of the 50%-combustion point retard amounts to a FB (feedback) controller 32, which calculates an FB correction amount. The dimension of the FE correction amount calculated here is equal to that of the 50%-combustion point retard amount. Incidentally, in the figure, a PID circuit is used as the FB controller 3; however, the other controllers may be used.

On the other hand, in the second feedback system, the control device allows a calculation section 40 to calculate torque generated by the internal combustion engine from an output value of the cylinder pressure sensor 4. Torque corresponds to a value obtained by integrating cylinder pressure by a crank angle, i.e., corresponds to area. Therefore, the torque generated by the internal combustion engine is uniquely calculated by processing the output value of the cylinder pressure sensor 4 in accordance with a predetermined calculation rule.

In the second feedback system, the control device sends demanded torque (target value) and actual torque (actual value) calculated by the calculation section 40 to a subtracter 42, which calculates a deviation between both. The control device sends the deviation of torque to an FB controller 44, which calculates an FB correction amount. The FB controller 44 sets a gain so as to allow the dimension of the FB correction amount thus calculated to coincide with that of the 50%-combustion point retard amount. A map making the connection between a value of torque and a value of the 50%-combustion point retard amount may be used to set a gain.

The control device selects any one of the two feedback systems in accordance with a predetermined rule. The control device sends the FB correction amount calculated by the selected feedback system and the control value of the 50%-combustion point retard amount to an adder 34, in which both are added to correct the control value of the 50%-combustion point retard amount. In the next step, the calculation section 26 carries out a calculation based on the control value of the 50%-combustion point retard amount corrected through the FB correction amount. The respective gains of the FB controllers 32, 44 are set such that the FB correction amounts calculated by the FB controllers 32, 44 positively reduce the deviation between the target value and actual value of the 50%-combustion point retard amount.

The feedback system selection rule obeyed by the control device is based on the magnitude of combustion variation. If the combustion variation is relatively small, the first feedback system is selected. If the combustion variation is relatively large, the second feedback system is selected. Since the combustion variation is reflected in the output value of the cylinder pressure sensor 4, the magnitude of the combustion variation can be evaluated by use of the 50%-combustion point retard amount calculated by the calculation section 28. In the present embodiment, the 50%-combustion point retard amounts in the past several cycles are obtained and their maximum value, minimum value and average value are calculated. Then, a combustion variation amount defined by the following expression is calculated as a parameter correlated with the magnitude of the combustion variation.

Combustion Variation Amount=(Maximum Value−Minimum Value)/Average Value

The control device allows a determination section 38 to calculate the above combustion variation amount and determine whether its calculated value is equal to or less than a predetermined threshold value. The above threshold value corresponds to an upper limit of combustion variation allowable with respect to accuracy of the 50%-combustion point retard amount. The control device selects a feedback system to be used in accordance with the determination result of the determination section 38 and operates a switch 36 in accordance with the selection.

The switch 36 is disposed between the FB controllers 32, 44 and the adder 34. The connection with the adder 34 is switched between the two FB controllers 32 and 44. An operation signal used to operate the switch 36 is supplied from the determination section 38. If the determination section 38 determines that the combustion variation amount is equal to or less than the threshold value, the switch 36 is operated to connect the FB controller 32 with the adder 34. In this way, the feedback control using the first feedback system is exercised. On the other hand, if the determination section 38 determines that the combustion variation amount exceeds the threshold value, the switch 36 is operated to connect the FB controller 44 with the adder 34. In this way, the feedback control using the second feedback system is exercised.

Figure 3:
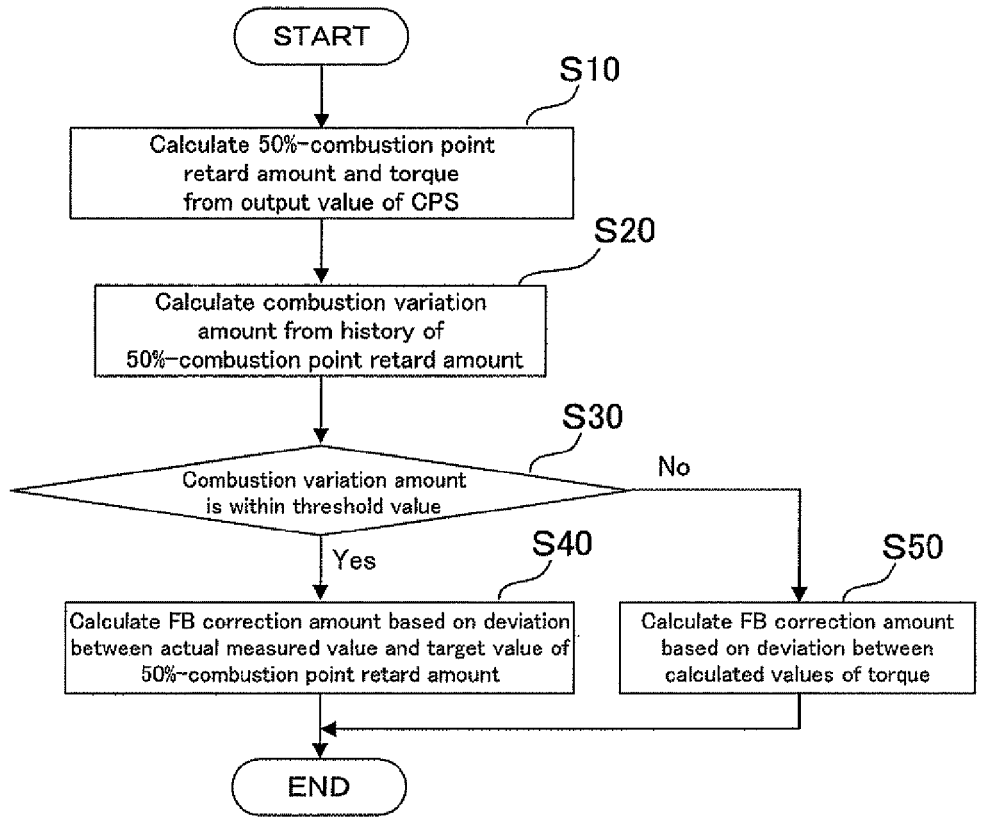
FIG. 3 is a flowchart illustrating a procedure for feedback control according to the first embodiment of the present invention.

FIG. 3 illustrates the procedure for the feedback control described above by use of a flowchart. In a first step S10, the control device calculates the 50%-combustion point retard amount from the output value of the cylinder pressure sensor 4 and in parallel with this calculates torque generated by the internal combustion engine.

In the next step S20, the control device calculates the combustion variation amount from the history of the 50%-combustion point retard amount in the past several cycles.

In the next step S30, the control device determines whether the combustion variation amount is equal to or less than the threshold value.

If the combustion variation amount is equal to or less than the threshold value, the control device selects the process of step S40. In step S40, the control device exercises the feedback control using the first feedback system. Specifically, the FB correction amount is calculated based on a deviation between an actual measured value and a target value of the 50%-combustion point retard amount. In addition, a control value of the 50%-combustion point retard amount is corrected with the FB correction amount.

If the result of the determination in step S30 is that the combustion variation amount exceeds the threshold value, the control device selects the process of step S50. In step S50, the control device exercises the feedback control using the second feedback system. Specifically, the FB correction amount is calculated based on a deviation between an actual measured value and a target value of torque. In addition, a control value of the 50%-combustion point retard amount is corrected with the FB correction amount.

In the present embodiment, the feedback control described above is combined with the feedforward control. As described above, the feedback control exercised in the present embodiment has one feature in which the first feedback system adapted to feedback the 50%-combustion point retard amount to the setting of ignition timing and the second feedback system adapted to feedback torque to the setting of ignition timing are switched depending on the magnitude of combustion variation. Since the 50%-combustion point retard amount is a parameter significantly correlated with the combustion state, the combustion state can accurately be controlled by exercising the feedback control by use of the 50%-combustion point retard amount. At the same time, the 50%-combustion point retard amount is susceptible to combustion variation. On the other hand, torque is a value obtained by integrating cylinder pressure by a crank angle, i.e., a value corresponding to area. Therefore, although torque does not have high sensitivity relative to a variation in combustion state unlike the 50%-combustion point retard amount, it is not largely varied by the influence of the combustion variation. According to the present embodiment, the combustion state can accurately be controlled by the feedback of the 50%-combustion point retard amount in the state where the combustion variation is relatively small and stable. In addition, in an unstable state where the combustion variation is large, torque replaced with the 50%-combustion point retard amount is fed back. In this way, even in the situation of the large combustion variation, the accurate control of the combustion state can be exercised by the continuation of the feedback control. In short, the present embodiment can stably exercise control the combustion state through ignition timing.

The feedback control exercised in the present embodiment is also characterized by using the 50%-combustion point retard amount as a control value and feeding back the output value of the cylinder pressure sensor 4 to the control value. In other words, the output value of the cylinder pressure sensor 4 is not directly fed back to the setting value of ignition timing. As seen from the configuration of the main map, this is because the relationship between ignition timing and the 50%-combustion point retard amount is varied depending on the operating conditions including engine speed. If the output value of the cylinder pressure sensor 4 is directly fed back to the setting value of ignition timing, the 50%-combustion point retard amount deviates depending on a variation in engine speed so that the combustion state deviates from an optimal state. In contrast to this, according to the present embodiment, ignition timing corresponding to the control value of the 50%-combustion point retard amount is determined taking the current engine speed as a key in the main map. Therefore, if engine speed is varied, also ignition timing is varied by the feedforward control corresponding thereto. Thus, time-delay does not occur from the variation of the operating condition until the ignition timing is optimized again. Further, the influence of the operating conditions such as engine speed and the like on the ignition timing is considered in the main map. Therefore, it is not necessary to consider the operating conditions such as engine speed in calculating the FB correction amount. Thus, the control device of the present embodiment can facilitate the optimal control of the combustion state in a state where the operating conditions are not only constant but variable.

Second Embodiment

Figure 4:
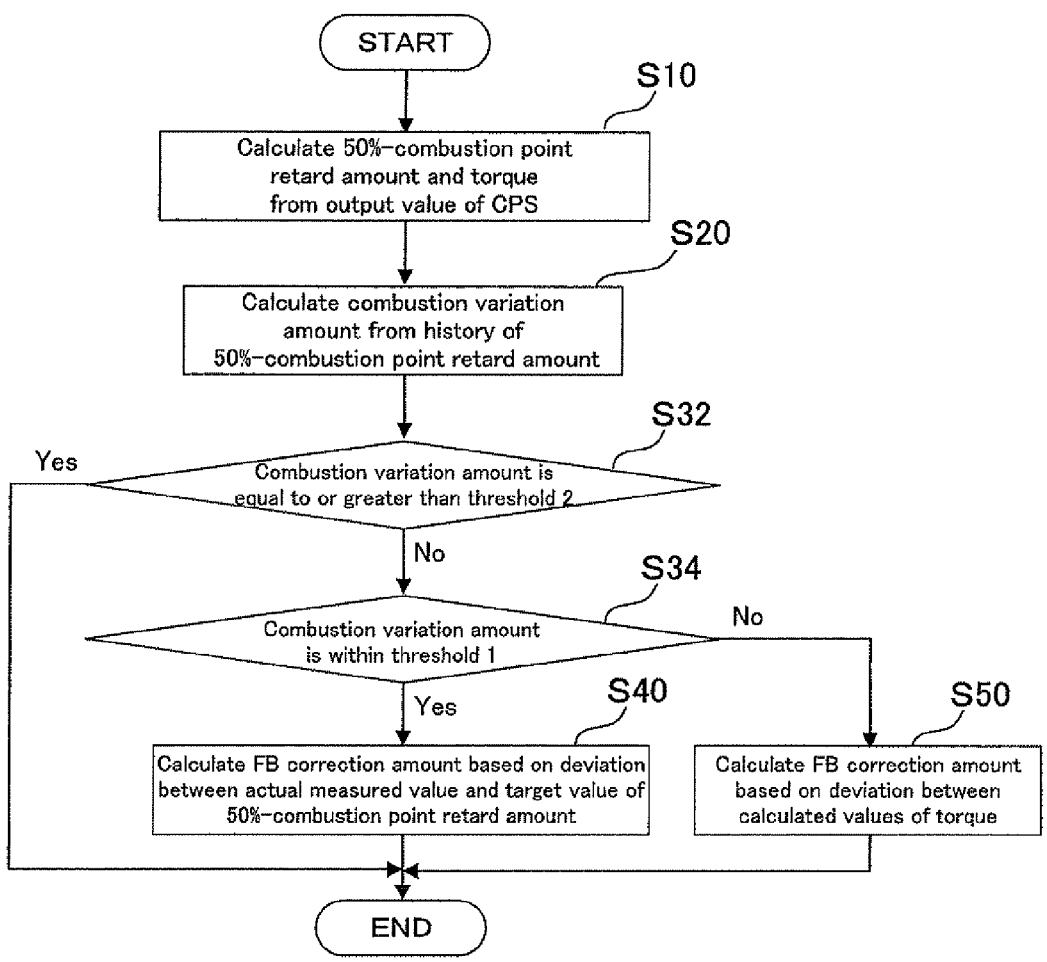
FIG. 4 is a flowchart illustrating a procedure for feedback control according to a second embodiment of the present invention.

A second embodiment of the present invention is next described with reference to FIG. 4.

The present embodiment is characterized by a procedure for feedback control. The configuration of a control device is the same as that of the first embodiment and is as illustrated in the block diagram of FIG. 1. FIG. 4 illustrates the procedure for feedback control of the present embodiment by use of a flowchart. In FIG. 4, processing common to the feedback control of the first embodiment is denoted with the same step number.

The feedback control according to the present embodiment determines the magnitude of a combustion variation amount in a two-step manner. The present embodiment sets two threshold values (threshold values 1 and 2) as a rule for two-step determination. Threshold value 1 is an upper limit of combustion variation allowable with respect to the accuracy of a 50%-combustion point retard amount calculated by the calculation section 28 and is the same value as the threshold value of the first embodiment. Threshold value 2 is an upper limit of combustion variation allowable with respect to the accuracy of torque calculated by the calculation section 40 and is greater than the threshold 1.

In step S32, the control device first determines whether a combustion variation amount is equal to or greater than threshold value 2. If the combustion variation amount is equal to or greater than threshold value 2, the control device stops all the feedback control without selection of any processing of steps S40 and S50. This is because if the combustion variation is too large, there is a possibility that the influence of the combustion variation is reflected in the setting of ignition timing even by use of torque in place of the 50%-combustion point retard amount.

If the combustion variation amount is less than threshold value 2, the control device makes a determination of step S34. In step S34, the control device makes a determination whether the combustion variation amount is equal to or less than threshold value 1. If the combustion variation amount is equal to or less than threshold value 1, the control device selects the processing of step S40. If the combustion variation amount exceeds threshold value 1, the control device selects the processing of step S50. The contents of the processing of steps S40 and S50 are as described in the first embodiment.

Third Embodiment

A third embodiment of the present invention is subsequently described with reference to FIG. 5.

Figure 5:
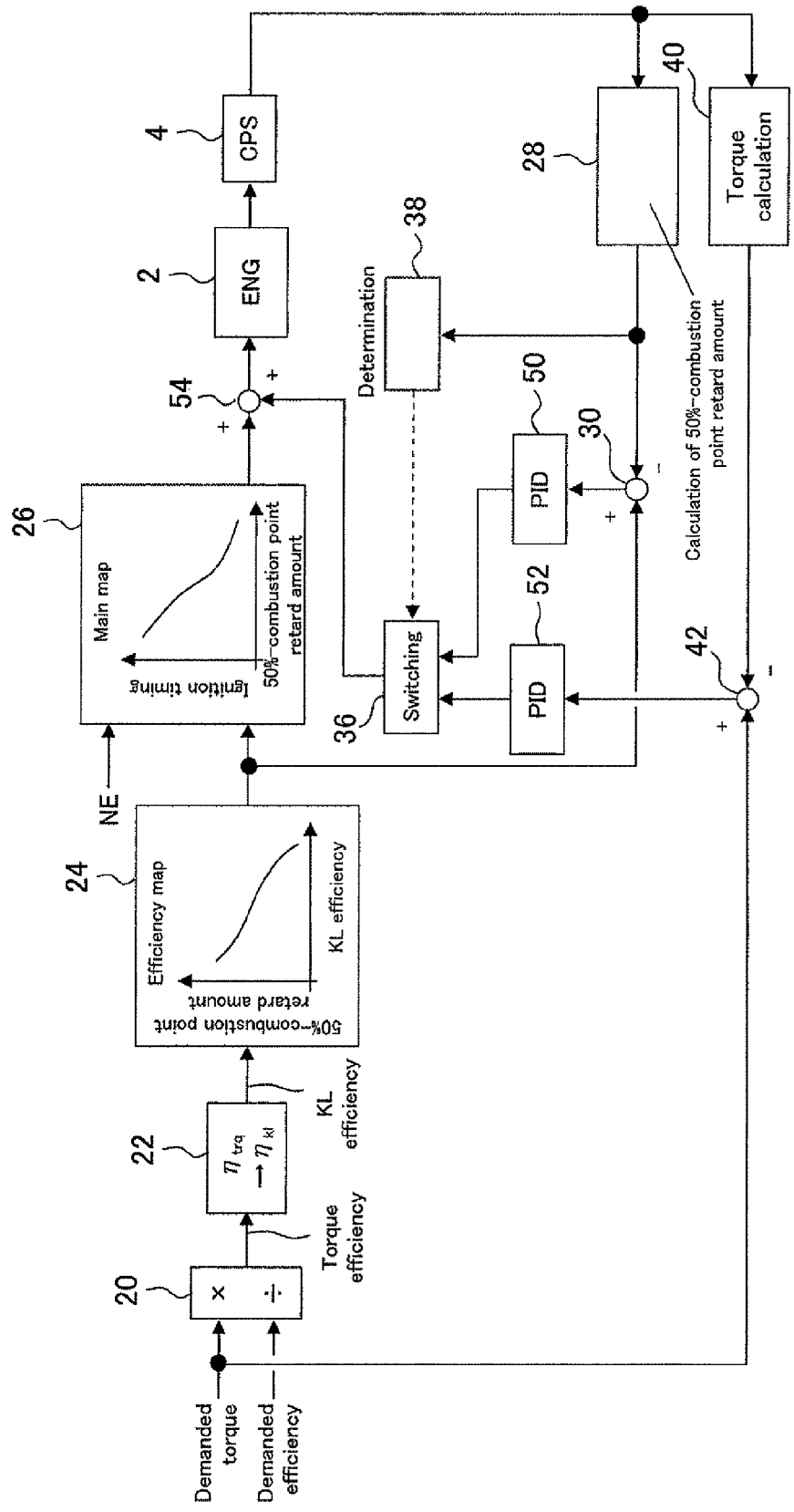
FIG. 5 is a block diagram illustrating a configuration of a control device for an internal combustion engine according to a third embodiment of the present invention.

FIG. 5 is a block diagram illustrating a configuration of a control device for an internal combustion engine according to the third embodiment of the present invention. In FIG. 5, elements common to those of the already-described embodiments are denoted with like reference numerals. In the following, the descriptions of the configurations and functions common to those of the already-described embodiments are omitted or abbreviated and configurations and functions different from those of already-described embodiments are mainly described.

A different point between the present embodiment and the already-described embodiments is a configuration for feedback control. The configuration for feedforward control is common to those of the already-described embodiments. The present embodiment is characterized by not correcting the 50%-combustion point retard amount as the control value with an FB correction amount but correcting a setting value of ignition timing with the FB correction amount. A setting value of ignition timing set by the calculation section 26 and an FB correction amount are sent to the adder 34. A value obtained by adding both is used as final ignition timing to operate an ignition device of the internal combustion engine 2. Incidentally, if the configuration of the present embodiment is adopted as described later, it is necessary to calculate the FB correction amount taking into consideration operating conditions such as engine speed, etc.

The control device of the present embodiment has two feedback systems similarly to the first embodiment already-described. A first feedback system of the control device sends a target value of a 50%-combustion point retard amount calculated by the calculation section 24 and an actual value of a 50%-combustion point retard amount calculated by the calculation section 28 to the subtracter 30, which calculates a deviation between both. The control device sends the deviation of the 50%-combustion point retard amounts to an FB controller 50, which calculates an FB correction amount. The FB controller 50 sets a gain so as to allow the dimension of the FB correction amount thus calculated to coincide with that of ignition timing. The gain is set by use of a map making the connection between the value of the 50%-combustion retard amount and the value of ignition timing while taking operating conditions such as engine speed and the like as a key.

A second feedback system of the control device sends demanded torque and actual torque calculated by the calculation section 40 to the subtracter 42, which calculates a deviation between both. The control device sends the deviation of torque to an FB controller 52, which calculates an FB correction amount. The FB controller 52 sets a gain so as to allow the dimension of the FB correction value thus calculated to coincide with that of ignition timing. The gain is set by use of a map making the connection between the value of torque and the value of ignition timing while taking the operating conditions such as engine speed and the like as a key.

Others

The embodiments of the present invention have been described thus far; however, the invention is not limited to the embodiments described above. The present invention can be implemented while variously modifying the above-described embodiments in a range not departing from the gist thereof. For example, the embodiments described above may be modified as below for implementation.

In the embodiments described above, if the combustion variation is greater than the threshold value, the switching to the second feedback system is done; however, the feedback control per se may be stopped. Specifically, only the first feedback system for feeding back the 50%-combustion point retard amount is provided. If it is probable that a combustion variation may be reflected in the setting of ignition timing, only the feedforward control may be exercised.

The above-described embodiments use the 50%-combustion point retard amount to exercise ignition timing control; however, other combustion-related parameters may be used. For example, a combustion-related parameter can be obtained from a pressure waveform outputted from the cylinder pressure sensor. Specifically, examples of the combustion-related parameters include a peak value of cylinder pressure, a pressure waveform of a predetermined crank angle range, and pressure-ingredient in the predetermined crank angle range. Alternatively, combustion-related parameters may be used that can be calculated from the output value of the cylinder pressure sensor, such as a heat release rate, heat production, a combustion rate, or a change ratio of generated heat. In short, the combustion-related parameter whose value is uniquely determined from the waveform of cylinder pressure relative to a crank angle can be used in place of the 50%-combustion point retard amount.

The above-described embodiments use as the combustion variation parameters the combustion variation amount calculated by use of the maximum value, minimum value, and average value of the 50%-combustion point retard amount in the past several cycles. However, other amounts of statistics may be used as combustion variation parameters if they are correlated with the magnitude of combustion variation. Not the combustion variation parameters are calculated from the 50%-combustion point retard amount but a value directly calculated from the output value of the cylinder pressure sensor can be used as the combustion variation parameter.

The invention claimed is:

1. A control device for a spark-ignition internal combustion engine equipped with a cylinder pressure sensor, comprising:
   means for setting a target value of a predetermined combustion-related parameter correlated with a combustion state;
   means for setting ignition timing based on a control value and an operating condition of the internal combustion engine including at least engine speed, the target value of the combustion-related parameter being used as the control value;
   means for operating an ignition device of the internal combustion engine in accordance with the ignition timing thus set;
   means for calculating a value of the combustion-related parameter from an output value of the cylinder pressure sensor;
   feedback means for calculating a correction amount of the control value based on a deviation between the calculated value and the target value of the combustion-related parameter;
   means for calculating a value of a predetermined combustion variation parameter correlated with the magnitude of a combustion variation from the output value of the cylinder pressure sensor; and
   means for stopping the feedback means correcting the control value if the calculated value of the combustion variation parameter exceeds a predetermined threshold value.

2. The control device for the internal combustion engine according to claim 1,
   wherein the means for setting the target value is adapted to set the target value of the predetermined combustion-related parameter based on a required torque; and
   wherein the control device further comprises:
   means for calculating torque generated by the internal combustion engine from the output value of the cylinder pressure sensor;
   second feedback means for calculating a correction amount of the control value based on a deviation between the calculated value of the generated torque and the required torque; and
   means for switching from the feedback control by the feedback means to the feedback control by the second feedback means when the calculated value of the combustion variation parameter exceeds the predetermined threshold value.

3. The control device for the internal combustion engine according to claim 2, further comprising:
   means for stopping the second feedback means correcting the control value if the calculated value of the combustion variation parameter exceeds a predetermined second threshold value which is larger than the predetermined threshold value.

4. The control device for the internal combustion engine according to claim 1,
   wherein the combustion variation parameter is a statistical amount of the combustion-related parameter.

5. The control device for the internal combustion engine according to claim 1,
   wherein the combustion-related parameter is a 50%-combustion point retard amount relative to a predetermined crank angle.

6. A control device for a spark-ignition internal combustion engine equipped with a cylinder pressure sensor, comprising:
   an ignition timing controller that is programmed to:
   set a target value of a predetermined combustion-related parameter correlated with a combustion state;
   set ignition timing based on a control value and an operating condition of the internal combustion engine including at least engine speed, the target value of the combustion-related parameter being used as the control value; and
   operate an ignition device of the internal combustion engine in accordance with the ignition timing thus set;
   a feedback circuit that is programmed to:
   calculate a value of the combustion-related parameter from an output value of the cylinder pressure sensor; and
   calculate a correction amount of the control value based on a deviation between the calculated value and the target value of the combustion-related parameter; and
   a feedback circuit controller that is programmed to:
   calculate a value of a predetermined combustion variation parameter correlated with the magnitude of a combustion variation from the output value of the cylinder pressure sensor; and
   stop the feedback circuit correcting the control value if the calculated value of the combustion variation parameter exceeds a predetermined threshold value.

* * * * *